US012629995B2

(12) United States Patent　　　　　(10) Patent No.: US 12,629,995 B2
Crump et al.　　　　　　　　　　　　(45) Date of Patent: May 19, 2026

(54) DOOR ASSEMBLIES FOR GROUND SUPPORT TRACTORS

(71) Applicant: Textron Ground Support Equipment Inc., Cartersville, GA (US)

(72) Inventors: Alexandra Elizabeth Crump, Cartersville, GA (US); Kevin Michael Ayotte, Acworth, GA (US)

(73) Assignee: Textron Ground Support Equipment Inc., Cartersville, GA (US)

( * ) Notice: Subject to any disclaimer, the term of this patent is extended or adjusted under 35 U.S.C. 154(b) by 361 days.

(21) Appl. No.: 18/244,604

(22) Filed: Sep. 11, 2023

(65) Prior Publication Data

US 2025/0083500 A1　　Mar. 13, 2025

(51) Int. Cl.
　　*B60J 5/04*　　　　(2006.01)
　　*B60J 5/06*　　　　(2006.01)
　　*B62D 33/06*　　　(2006.01)
　　*E05B 77/00*　　　(2014.01)
　　*E05B 83/40*　　　(2014.01)
　　*G01L 5/00*　　　(2006.01)
(52) U.S. Cl.
　　CPC ........... *B60J 5/0486* (2013.01); *B60J 5/0413* (2013.01); *B60J 5/047* (2013.01); *B60J 5/06* (2013.01); *B62D 33/06* (2013.01); *E05B 77/00* (2013.01); *E05B 83/40* (2013.01); *G01L 5/009* (2013.01)
(58) Field of Classification Search
　　None
　　See application file for complete search history.

(56) References Cited

U.S. PATENT DOCUMENTS 1,957,645　A　*　5/1934　Herman ................... B60P 3/007
　　　　　　　　　　　　　　　　　　　　　296/25
3,337,993　A　*　8/1967　Von Seggern ...... E05B 65/0811
　　　　　　　　　　　　　　　　　　　　　49/281
(Continued)

FOREIGN PATENT DOCUMENTS

CN　　　207360437 U　　5/2018
CN　　　209290722 U　　8/2019
CN　　　209634747 U　　11/2019
(Continued)

OTHER PUBLICATIONS

Combined Search and Examination Report; UK Intellectual Property Office; Dec. 2, 2024.

*Primary Examiner* — Joseph D. Pape
(74) *Attorney, Agent, or Firm* — Lawrence Youst PLLC

(57)　　　　　　ABSTRACT

A ground support tractor includes a wheeled chassis having a cabin mounted thereon. A door assembly is coupled to the cabin. The door assembly includes a lower track having a ramp and a door slidably received by the lower track and translatable in a first direction relative to the cabin between a closed position and an open position. The door includes a main panel and a closeout panel that is translatable relative to the main panel in a second direction between an extended position and a retracted position with the second direction being substantially normal to the first direction. The ramp is configured to apply a retraction force to the closeout panel that causes the closeout panel to translate from the extended position to the retracted position responsive to the door translating from the closed position to the open position.

19 Claims, 10 Drawing Sheets

(56)              References Cited

U.S. PATENT DOCUMENTS 3,982,601  A  *   9/1976  Williams  ............... B60J 5/0487
                                                    296/202
7,003,915  B2 *   2/2006  Yokomori  ............. E05F 15/603
                                                    49/360

FOREIGN PATENT DOCUMENTS

CN          209634749  U      11/2019
CN          209634752  U      11/2019
DE           19615590  A1     10/1997
FR            2597802  A1 *   10/1987  ................ B60J 5/06
GB             664862  A  *   1/1952   .......... B61D 19/004
GB             843343  A  *   8/1960
GB            2529452  A      2/2016
WO          2024115762  A1     6/2024

* cited by examiner

DOOR ASSEMBLIES FOR GROUND SUPPORT TRACTORS

TECHNICAL FIELD OF THE DISCLOSURE

The present disclosure relates, in general, to door assemblies for ground support tractors and, in particular, to a door assembly for a ground support tractor that has a door with a closeout panel that translates from an extended position to a retracted position responsive to the door translating from a closed position to an open position.

BACKGROUND

Ground support tractors, also known as airport tugs or aircraft tugs, are designed to transport and handle diverse types of loads at airports. For example, certain ground support tractors are used to move and tow aircraft on the ground. These ground support tractors are designed to maneuver aircraft safely and efficiently in and out of gates, hangars, runways and other areas of the airport. Such ground support tractors are essential for tasks such as pushing aircraft back from the gate, positioning aircraft for departure and towing aircraft to maintenance or storage areas. As such, these ground support tractors ensure that aircraft are properly positioned and ready for takeoff or maintenance, contributing to the smooth operation of the airport. Other ground support tractors are equipped with specialized attachments, such as cargo loaders or baggage carts that allow them to efficiently move luggage, cargo containers and other types of freight between different areas of the airport, such as the terminal, the cargo hold of an aircraft and airport storage facilities. As such, these ground support tractors help streamline the process of loading, transporting and unloading cargo and baggage.

As ground support tractors operate in confined spaces and in close proximity to aircraft, it has been found that opening the doors of a ground support tractor can create impact hazards. For example, if the doors of a ground support tractor open outward, similar to a typical car door, this can create an impact risk with other vehicles or equipment in a baggage room of an airport. Likewise, if the doors of a ground support tractor open upward, as typical of a gullwing or scissor door, this can create an impact risk with an undercarriage of an aircraft. Accordingly, a need has arisen for a ground support tractor that has doors that do not create an impact risk to nearby aircraft when the doors are opened.

SUMMARY

In a first aspect, the present disclosure is directed to a door assembly for a vehicle. The door assembly includes a lower track having a ramp and a door slidably received by the lower track and translatable relative thereto in a first direction between a closed position and an open position. The door includes a main panel and a lower panel that is translatable relative to the main panel in a second direction between an extended position and a retracted position. The ramp is configured to apply a retraction force to the lower panel that causes the lower panel to translate from the extended position to the retracted position responsive to the door translating from the closed position to the open position.

In some embodiments, the second direction may be substantially normal to the first direction. In certain embodiments, the first direction may be a longitudinal direction and the second direction may be a vertical direction. In some embodiments, the main panel may include inner and outer skins between which the lower panel may be positioned when the lower panel is in the retracted position. In some embodiments, the lower panel may be slidably coupled to an interior surface of one of the inner and outer skins of the main panel. In certain embodiments, the ramp may have a slope between thirty degrees and forty-five degrees such as a slope of about thirty-five degrees. In some embodiments, the lower panel may have a lift surface configured to contact the ramp. In such embodiments, the ramp and the lift surface may have substantially common slopes.

In a second aspect, the present disclosure is directed to a ground support tractor including a wheeled chassis having a cabin mounted thereon. A door assembly is coupled to the cabin. The door assembly includes a lower track having a ramp and a door slidably received by the lower track and translatable in a first direction relative to the cabin between a closed position and an open position. The door includes a main panel and a closeout panel that is translatable relative to the main panel in a second direction between an extended position and a retracted position with the second direction being substantially normal to the first direction. The ramp is configured to apply a retraction force to the closeout panel that causes the closeout panel to translate from the extended position to the retracted position responsive to the door translating from the closed position to the open position.

In certain embodiments, the door assembly may include an upper track such that the lower track and the upper track limit movement of the door to translation in the first direction relative to the cabin. In some embodiments, the door assembly may include a forward latch configured to secure the door in the closed position. In certain embodiments, the door assembly may include an aft latch configured to secure the door in the open position. In some embodiments, the cabin may include a cabin floor such that the closeout panel has a contact relationship with the cabin floor when the door is in the closed position. In certain embodiments, the closeout panel may be disposed within the main panel when the closeout panel is in the retracted position. In some embodiments, the main panel may include inner and outer skins between which the closeout panel may be positioned when the closeout panel is in the retracted position. In certain embodiments, the door assembly may include a telescoping slide assembly that is coupled between the closeout panel and at least one of the inner and outer skins. In such embodiments, the telescoping slide assembly may be a vertically oriented linear telescoping slide assembly. In some embodiments, the closeout panel may translate from the retracted position to the extended position responsive to a gravitational force as the door translates from the open position to the closed position.

In a third aspect, the present disclosure is directed to a ground support tractor including a wheeled chassis with a cabin mounted thereon. A door assembly is coupled to the cabin. The door assembly includes a lower track having a ramp and a door slidably received by the lower track and translatable in a longitudinal direction relative to the cabin between a closed position and an open position. The door includes a main panel and a closeout panel that is translatable in a vertical direction relative to the main panel between an extended position and a retracted position with the closeout panel having a lift surface. The closeout panel is in the extended position when the door is in the closed position. The closeout panel is in the retracted position when the door is in the open position. The closeout panel translates from the extended position to the retracted position responsive to contact between the lift surface and the ramp as the door translates from the closed position to the open position. The closeout panel translates from the retracted position to the extended position as the door translates from the open position to the closed position.

In some embodiments, the ramp may be configured to apply a retraction force to the closeout panel that causes the closeout panel to translate from the extended position to the retracted position responsive to the door translating from the closed position to the open position. In certain embodiments, the closeout panel may translate from the retracted position to the extended position responsive to a gravitational force as the door translates from the open position to the closed position.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1:
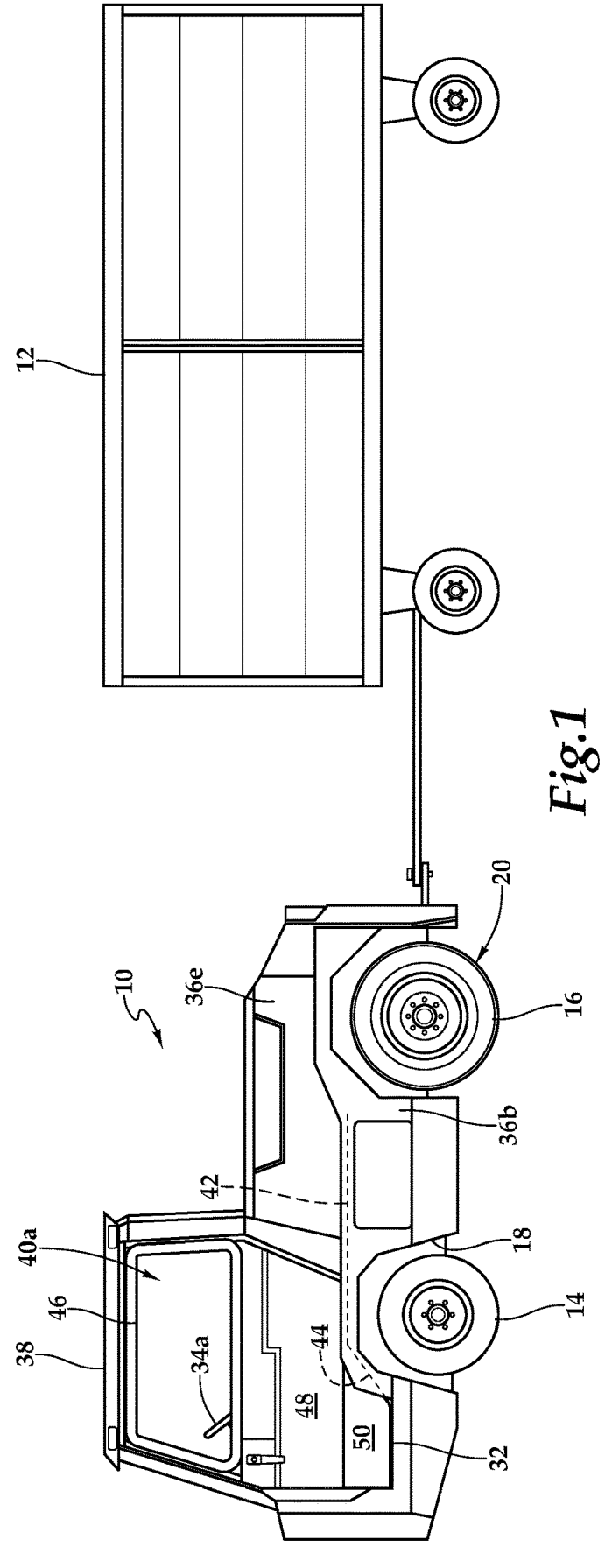
FIG. 1 is a schematic illustration of a ground support tractor towing a cargo container in accordance with embodiments of the present disclosure.

Referring to FIG. 1 in the drawings, a land vehicle depicted as a ground support tractor is schematically illustrated and generally designated 10. In the illustrated embodiment, ground support tractor 10 is towing a load depicted as a cargo container 12 at an airport, such as between the terminal and a cargo hold of an aircraft. Ground support tractor 10 is a wheeled vehicle that includes a pair of front steering control wheels, left front wheel 14 being visible, and a pair of aft drive wheels, left aft wheel 16 being visible. Each of the front wheels of ground support tractor 10 is positioned within a front wheel well, left front wheel well 18 being visible, with the front wheel wells sized to allow turning of the front wheels therein to control the direction of travel of ground support tractor 10 when ground support tractor 10 is moving. Structural support for ground support tractor 10 is provided by chassis 20, on or around which the various components of ground support tractor 10 are assembled (see also FIG. 2A). Chassis 20 is formed of a plurality of structural members that are interconnected by welds, bolts and/or other suitable fastening means. The structural members include a plurality of frame members 22 and a plurality of plate members 24 comprised of metal or metal alloy, such as steel or aluminum. When the front and rear wheels are coupled thereto, the chassis may be referred to as a wheeled chassis 20.

Figures 2A, 2B:
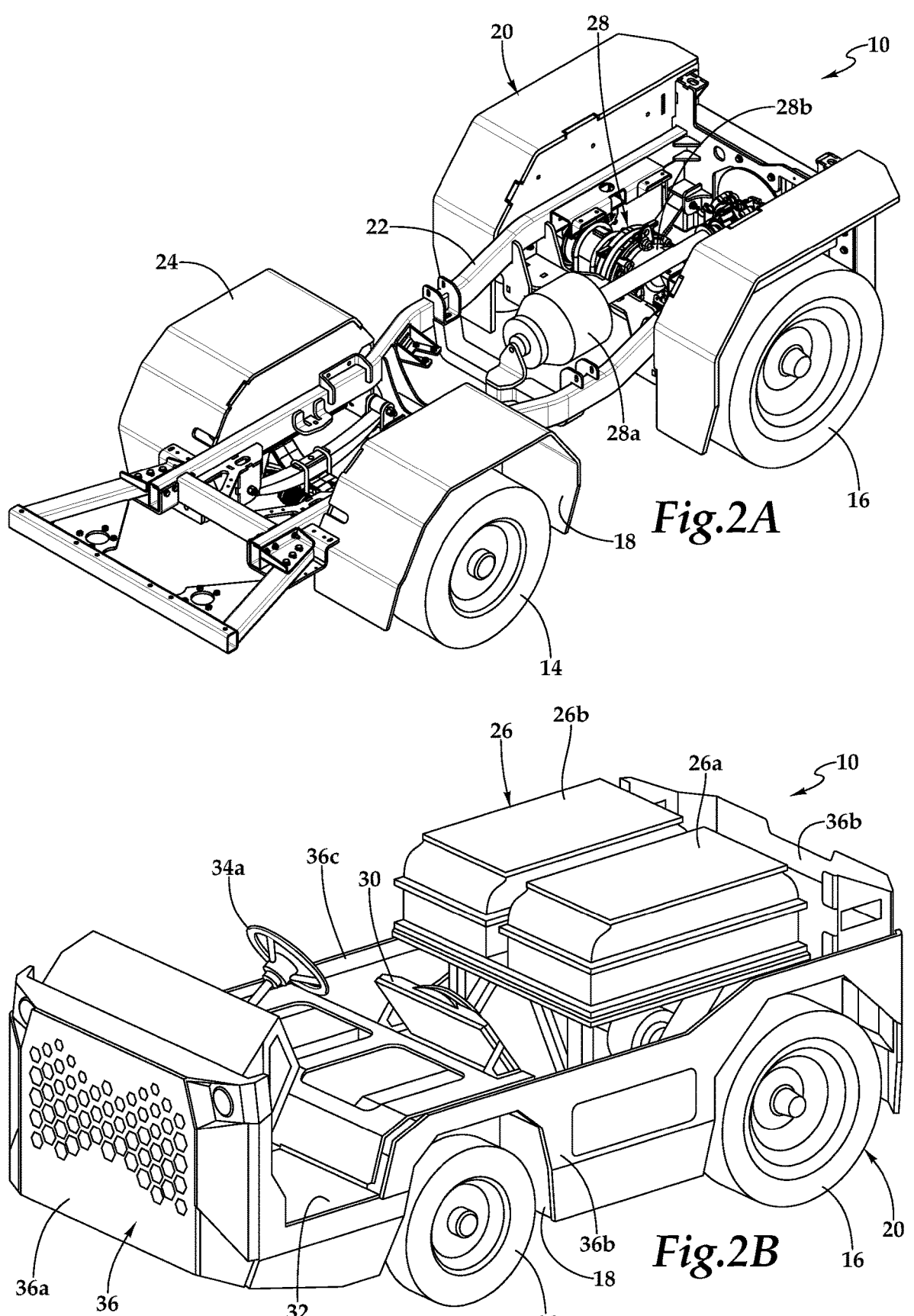
FIGS. 2A-2B are schematic illustrations of a ground support tractor having selected components removed therefrom in accordance with embodiments of the present disclosure.

In the illustrated embodiments, ground support tractor 10 includes a battery array 26 including battery packs 26a, 26b that are coupled to an aft portion of wheeled chassis 20 (see also FIG. 2B). Battery array 26 provides the energy necessary to power the movement of ground support tractor 10 as well as the various electronic components of ground support tractor 10. Ground support tractor 10 includes a drive train 28 depicted as including an electric motor 28a and a transaxle 28b that are operably coupled to the aft drive wheels of ground support tractor 10 and receive electrical energy from battery array 26. An electronic motor controller 30 is operably coupled to electric motor 28a and provides control functionality for electric motor 28a. In other embodiments, the powertrain of ground support tractor 10 may include an internal combustion engine and a transmission. Ground support tractor 10 has a forward base plate assembly that forms a cabin floor 32. Ground support tractor 10 has vehicle controls including steering controller 34a that is operably coupled to the front wheels and motion controllers 34b depicted as pedals for accelerating and stopping ground support tractor 10 (see also FIG. 4D). In the illustrated embodiment, the vehicle controls are depicted on the left side of ground support tractor 10 such that ground support tractor 10 is configured to have the driver on the left side of the vehicle, thus defining the left side of ground support tractor 10 as the driver side and the right side of ground support tractor 10 as the passenger side. In other embodiments, the vehicle controls may be positioned on the right side of a ground support tractor. Ground support tractor 10 has various body panels 36 including, for example, a front body panel 36*a*, a left side lower body panel 36*b*, a right side lower body panel 36*c*, an aft body panel 36*d* and a left side upper body panel 36*e*. One or more of body panels 36 may be integrally formed together or may be interconnected by welds, bolts and/or other suitable fastening means. Likewise, one or more of body panels 36 may be formed from multiple panel members. Body panels 36 are coupled to wheeled chassis 20 by welds, bolts and/or other suitable fastening means to provide an outer skin for ground support tractor 10 and protect the various operating components of ground support tractor 10 disposed therein. Body panels 36 are preferably comprised of metal or metal alloy, such as steel or aluminum.

Figure 7:
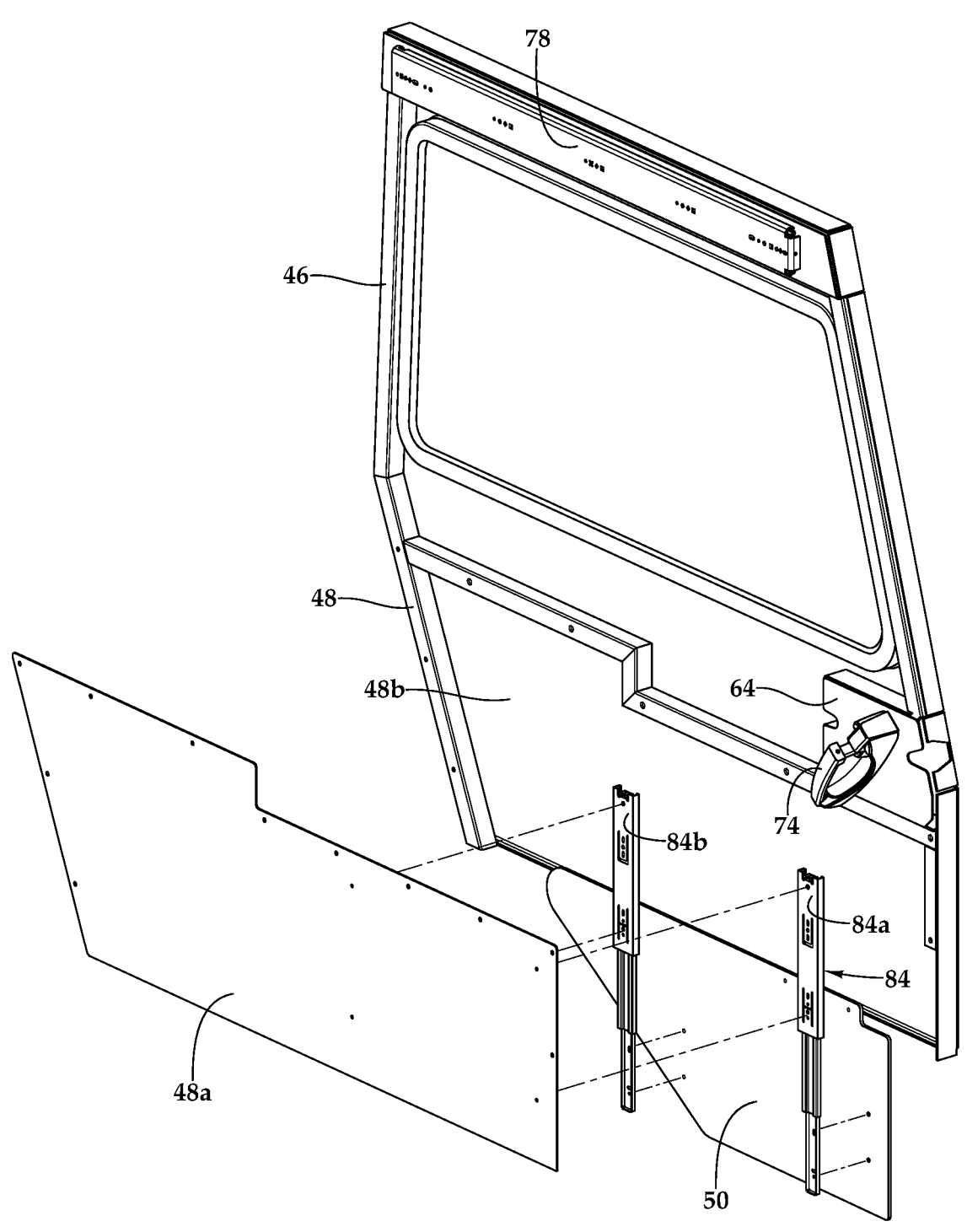
FIG. 7 is an exploded view of a door for a ground support tractor in accordance with embodiments of the present disclosure.

Ground support tractor 10 includes a cabin 38 that is mounted on wheeled chassis 20 above cabin floor 32 to provide an enclosure for the operators of ground support tractor 10. Ground support tractor 10 includes a driver side door assembly 40*a* and passenger side door assembly 40*b* (see also FIG. 3A). It is noted that passenger side door assembly 40*b* is substantially similar to driver side door assembly 40*a* therefore, for sake of efficiency, certain features will be disclosed only with regard to driver side door assembly 40*a*. One having ordinary skill in the art, however, will fully appreciate an understanding of passenger side door assembly 40*b* based upon the disclosure herein of driver side door assembly 40*a*. Driver side door assembly 40*a* includes a lower track 42 having a ramp 44 and a door 46 that is slidably received by lower track 42 and translatable relative thereto in a fore/aft or longitudinal direction of ground support tractor 10 between a closed position and an open position. Door 46 includes a main panel 48 and a lower panel, depicted as a closeout panel 50, that is translatable relative to main panel 48 in a vertical direction between an extended position and a retracted position. Door 46 is formed predominantly of metal or metal alloy, such as steel or aluminum. For example, main panel 48 is formed from inner and outer metals skins 48*a*, 48*b* (see also FIG. 7) that form a pocket therebetween that is configured to receive closeout panel 50 therein when closeout panel 50 is in the retracted position. Closeout panel 50 may be comprised of metal, metal alloy, polymeric materials, fiber reinforced polymer composites and/or combinations thereof.

Closeout panel 50 is an important feature of ground support tractor 10 as it provides a shielding and/or sealing functionality in the area forward of wheel well 18, below main panel 48 of door 46 and above cabin floor 32 that could otherwise be open to the environment. Specifically, during operation of ground support tractor 10, closeout panel 50 protects the inside of cabin 38 and the operators of ground support tractor 10 from unpleasant outdoor environments such as wind, rain, snow and ice. In addition, closeout panel 50 helps to maintain a desired temperature within cabin 38 by retaining warmed air in the winter and retaining cooled air in summer. Having a closeout panel that extends below an upper portion of the front wheel well, however, creates certain difficulties when opening the associated door as the closeout panel tends to collide with the wheel well as the door is being open. Attempts have been made to solve this problem using pivoting doors or doors having a lower panel that pivots relative to an upper panel. In the case of the former, such designs require complex mechanisms and dedicated actuation means to pivot the entire weight of the door around the wheel well. In the case of the latter, it has been found that the pivoting of the lower panel relative to the upper panel may lead to the lower panel becoming stuck and/or malfunctioning over time. In the present disclosure, these and other drawbacks of current ground support tractor door designs are overcome by configuring ramp 44 to apply a retraction force to closeout panel 50 that causes closeout panel 50 to translate from the extended position to the retracted position responsive to door 46 translating from the closed position to the open position.

Referring additionally to FIG. 3A-3D and 4A-4B in the drawings, cabin 38 includes a windshield 52 and a rear glass 54 that enable the operators of ground support tractor 10 to see in front of and behind ground support tractor 10 during operations. Cabin 38 also includes a roof 56 having a plurality of safety lights 58 that provides protection for the operators of ground support tractor 10 and the components within cabin 38. Positioned within cabin 38 are driver seat 60*a* and passenger seat 60*b* from which the operators control ground support tractor 10. Ground support tractor 10 includes driver side door assembly 40*a* and passenger side door assembly 40*b*, each of which is configured to selectively enable and prevent ingress to and egress from cabin 38.

Figure 3A:
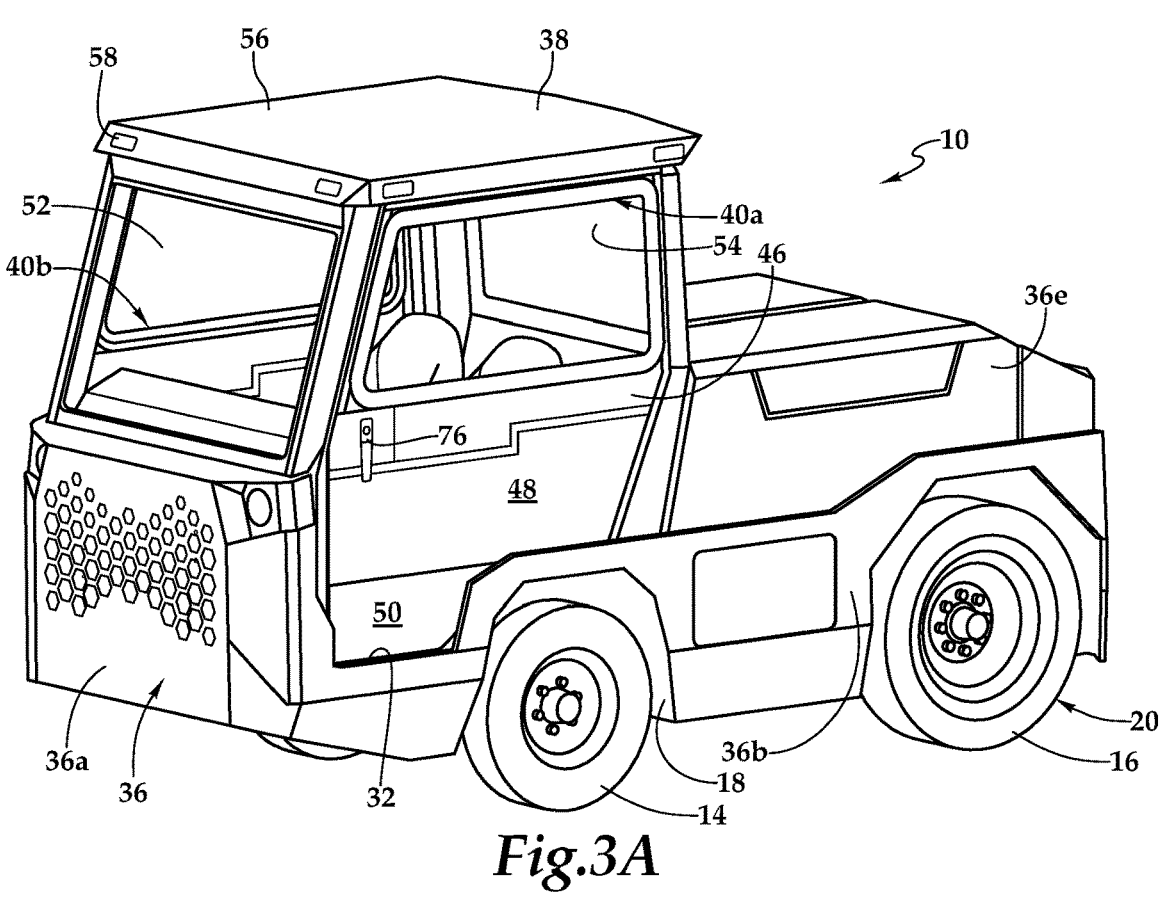
FIGS. 3A-3D are sequential isometric views of a ground support tractor depicting the operation of a door assembly in accordance with embodiments of the present disclosure.
Figure 4A:
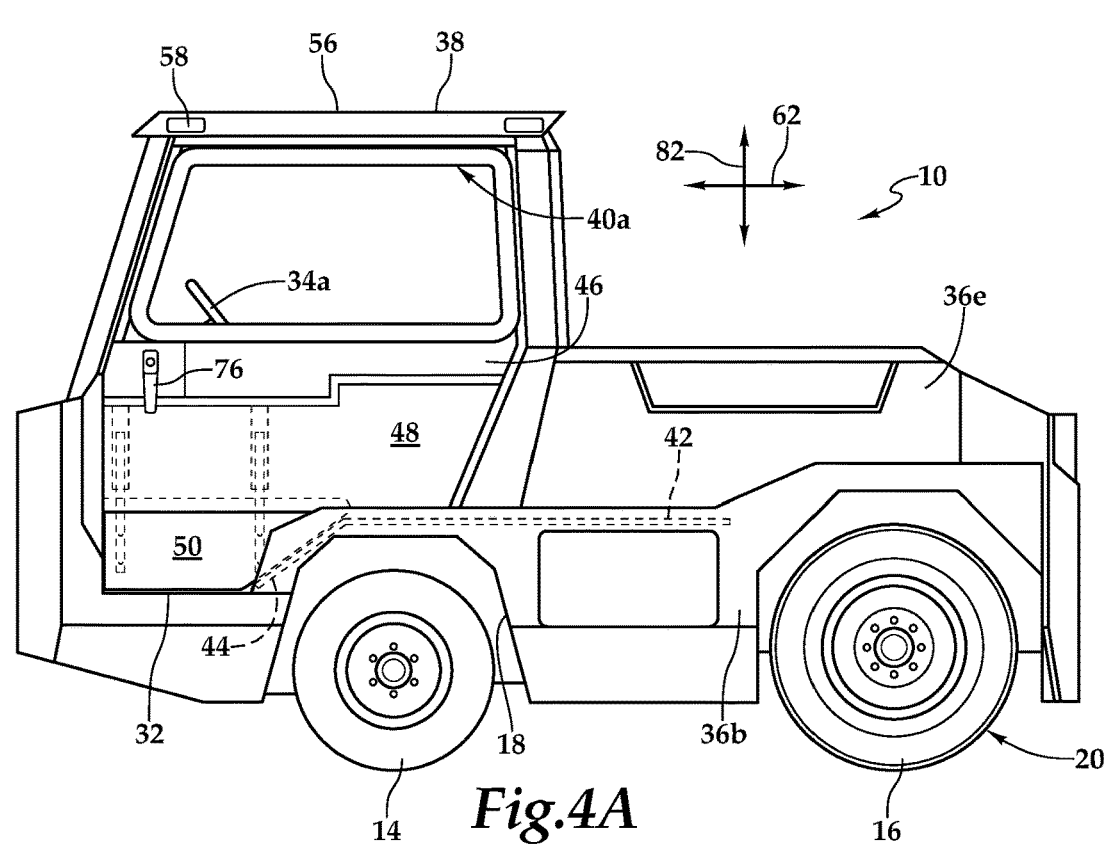
FIGS. 4A-4D are sequential side views of a ground support tractor depicting the operation of a door assembly in accordance with embodiments of the present disclosure.

The operation of driver side door assembly 40*a* will now be described. Door assembly 40*a* is configured to allow door 46 to translate relative to cabin 38 in a longitudinal direction of ground support tractor 10, as indicated by arrow 62 in FIG. 4A, between a plurality of positions including a fully closed position (see FIGS. 3A, 4A) and a fully open position (see FIGS. 3D, 4D). In the fully closed position, door 46 is in a fully forward orientation with the forward latch of latch assembly 64 coupled to a door striker, depicted as a metal hook 66, that is coupled to a forward portion of door frame 68 and that secures door 46 in the fully closed position (see also FIG. 5A depicting an inside view of driver side door assembly 40*a* with the dashboard and steering controls removed and FIG. 5B depicting latch assembly 64 in the forward secure position). In this position, door 46 has a sealing engagement with door frame 68 provided by forward door seals 70*a*, 70*b* and aft door seal 72. Also, in the fully closed position, closeout panel 50 is in the extended position. In the illustrated embodiment, due to the force of gravity, closeout panel 50 has a contact relationship with cabin floor 32 which provides a substantial seal therewith. In other embodiments, a mechanical assist mechanism may be used to bias closeout panel 50 toward the extended position. For example, such mechanical assist mechanisms may include spring systems or piston assemblies. The sealing relationship of door 46 with door frame 68 and cabin floor 32 not only helps to prevent unpleasant outdoor environments such as wind, rain, snow and ice from entering cabin 38 but also helps to prevent the escape of heated or cooled air from within cabin 38.

Figure 6:
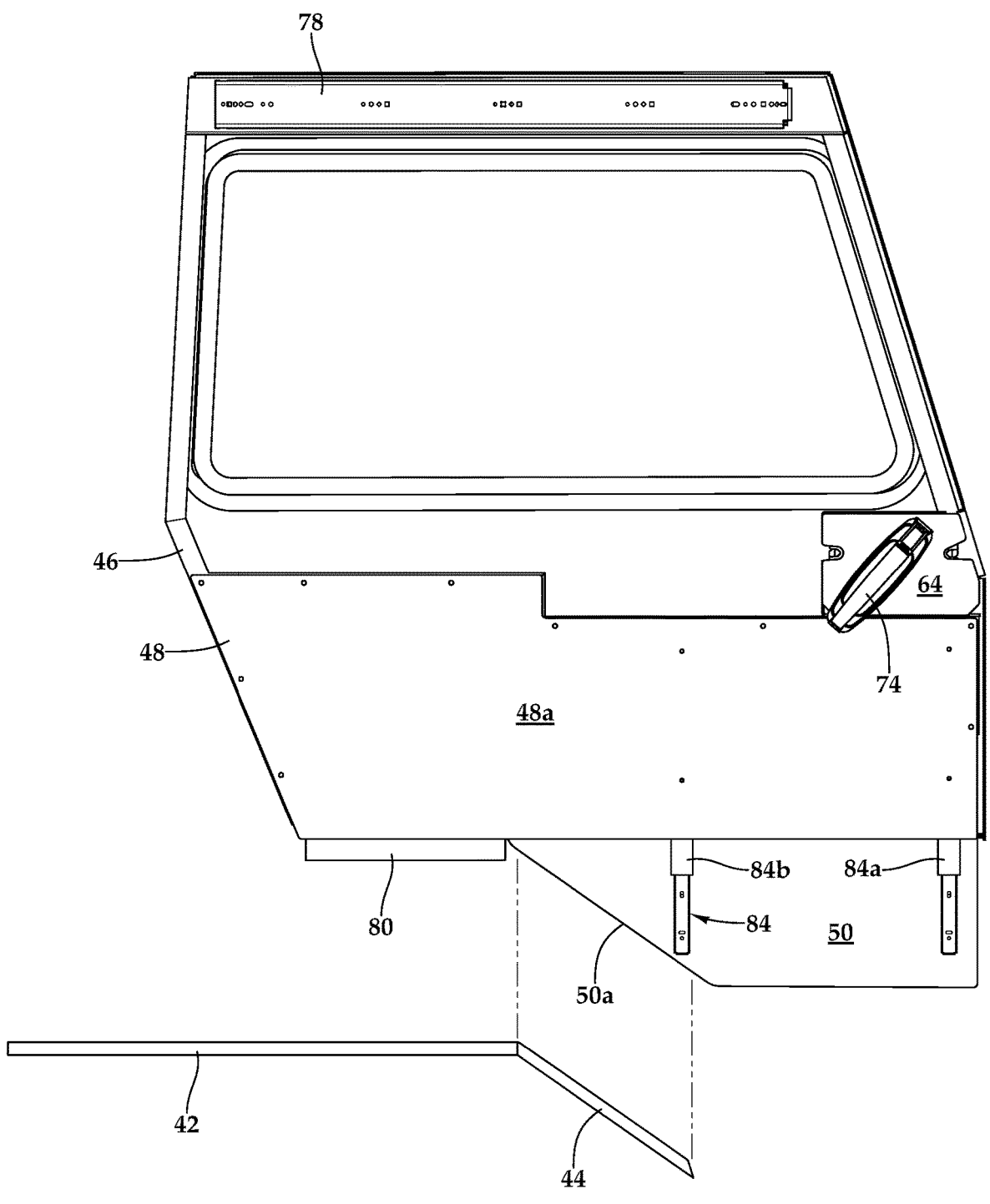
FIG. 6 is an exploded view of a door and a lower track of a door assembly for a ground support tractor in accordance with embodiments of the present disclosure.
Figures 8A, 8B:
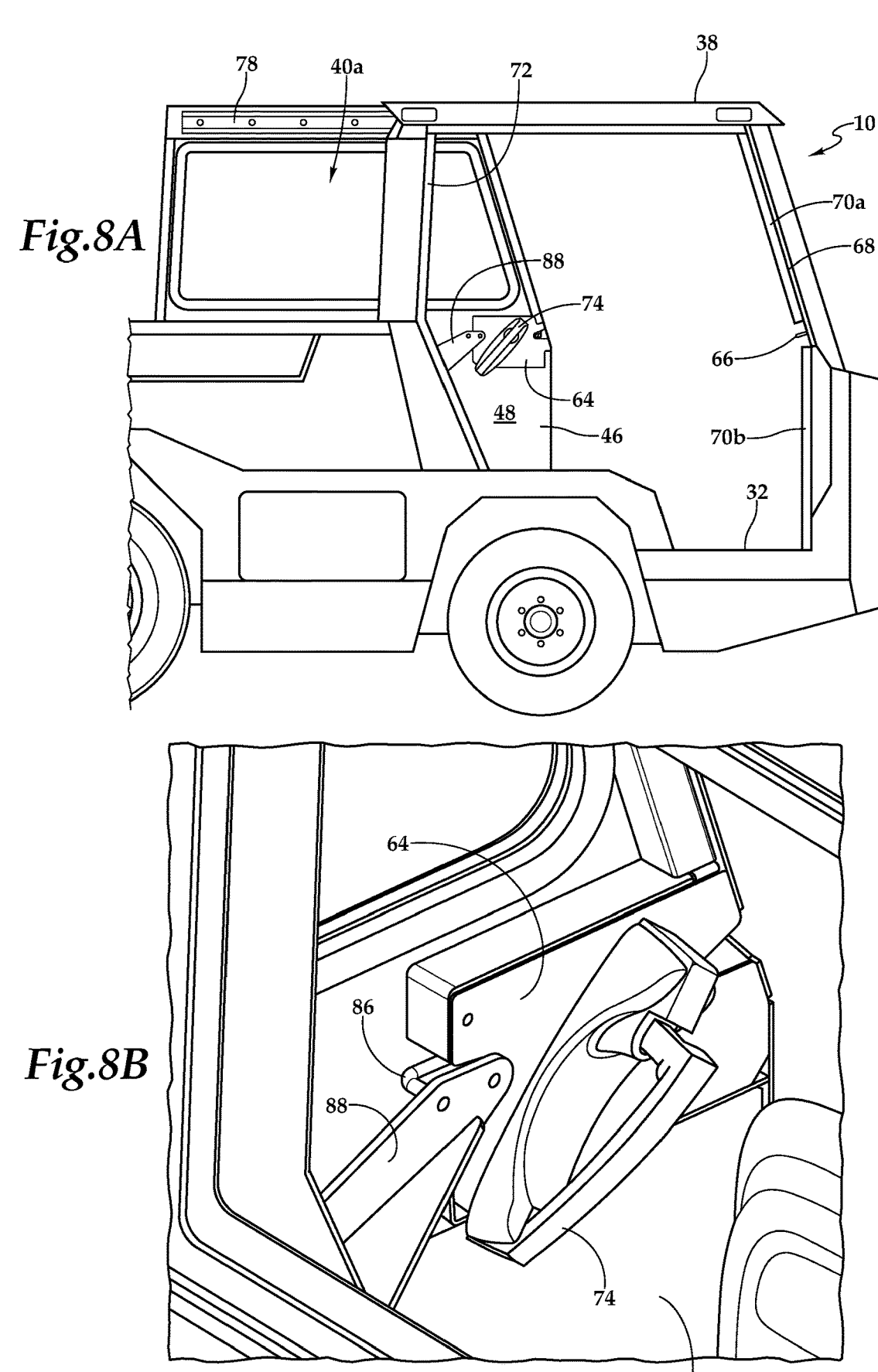
FIGS. 8A-8B are schematic illustrations depicting a door of a ground support tractor in the fully open position in accordance with embodiments of the present disclosure.

When it is desired to open door 46, the operator disengages the forward latch of latch assembly 64 from metal hook 66 using interior handle 74 or exterior handle 76 of door assembly 40*a*. Door 46 is now free to translate in the longitudinal direction relative to cabin 38. Primary support for door 46 is provided by an upper track 78, depicted as a telescoping slide assembly, that is coupled between an upper portion of door frame 68 and an upper portion of door 46, as best seen in FIG. 8A. In the illustrated embodiment, a lower portion of door 46 includes a guide depicted as a C-channel 80 that is received on lower track 42, as best seen in FIG. 6. Lower track 42 is positioned in a slot between body panel 36b and body panel 36e. Together, upper track 78 and lower track 42 constrain door 46 to travel in longitudinal direction 62 with little or no travel in the lateral direction of ground support tractor 10 or the vertical direction, as indicated by arrow 82 in FIG. 4A. In addition, the use of upper track 78 together with lower track 42 limits and/or prevents vibration of door 46 relative to door frame 68 during operations. Preferably, C-channel 80, lower track 42 and/or the bearing surfaces therebetween are formed from a material with low friction, high wear resistance and low moisture absorption such as an ultra-high molecular weight polyethylene. In other embodiments, the lower track could alternatively include a telescoping slide assembly or other guide system configured to constrain door 46 to travel in longitudinal direction 62 with minimal friction.

Figure 3B:
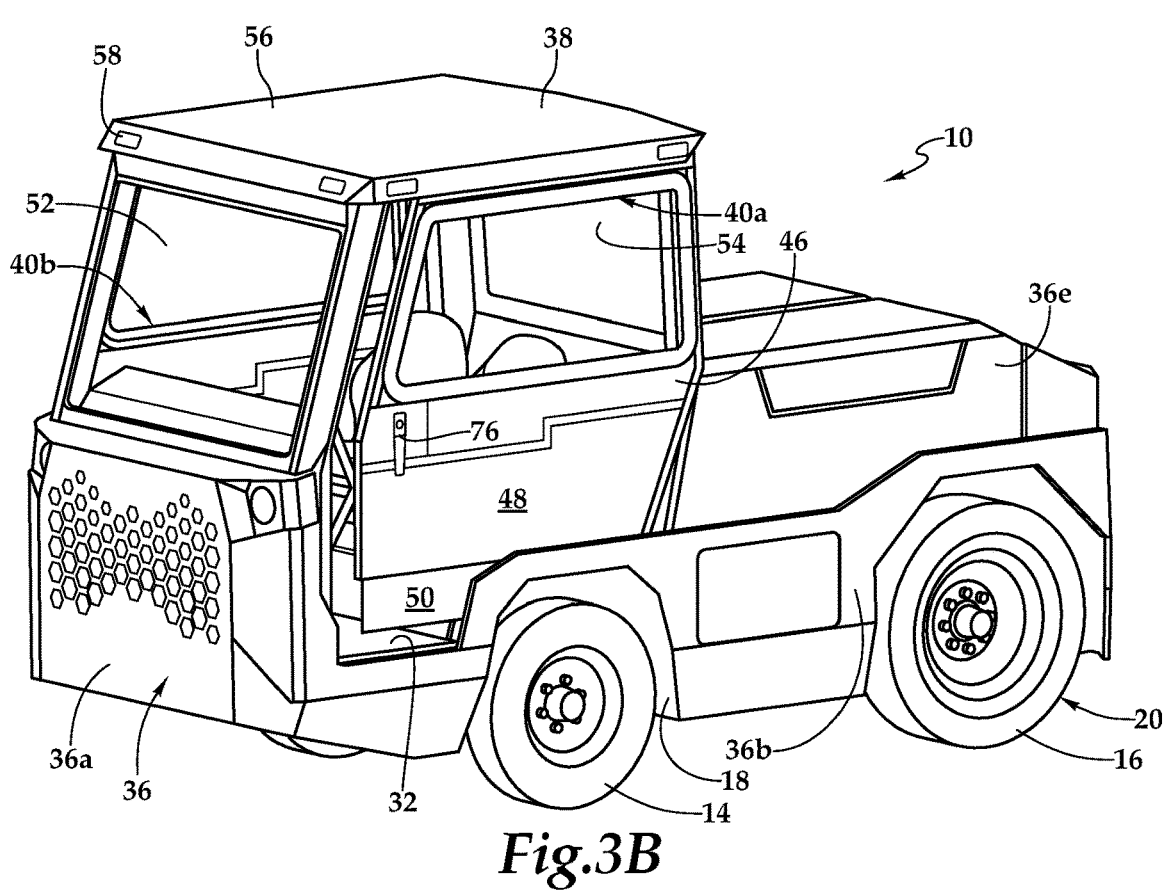
Figure 4B:
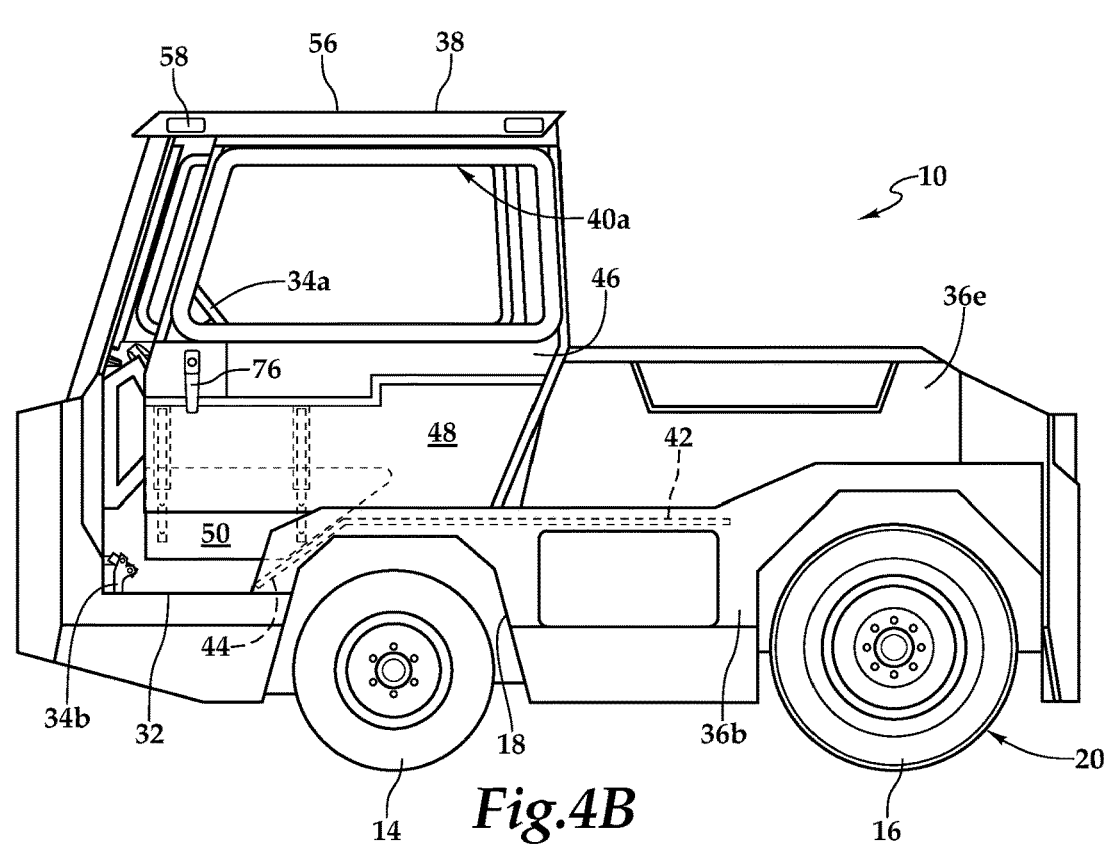

As best seen in FIGS. 3B and 4B, as the operator translates door 46 from the fully closed position toward the fully open position, upper track 78 extends, C-channel 80 slides aftward along lower track 42 and closeout panel 50 begins to retract from the extended position into main panel 48 of door 46. More specifically, closeout panel 50 includes a lift surface 50a on the aft edge thereof that is configured to interface with ramp 44 of lower track 42. In the illustrated embodiment, ramp 44 has a slope of between thirty degrees and forty-five degrees and preferably about thirty-five degrees. Likewise, lift surface 50a has a slope of between thirty degrees and forty-five degrees and preferably about thirty-five degrees such that lift surface 50a and ramp 44 have substantially matching or common slopes. In this manner, when lift surface 50a contacts ramp 44 due to the aftward translation of door 46, ramp 44 applies a retraction force on closeout panel 50 which causes closeout panel 50 to begin retracting into main panel 48.

Figure 3C:
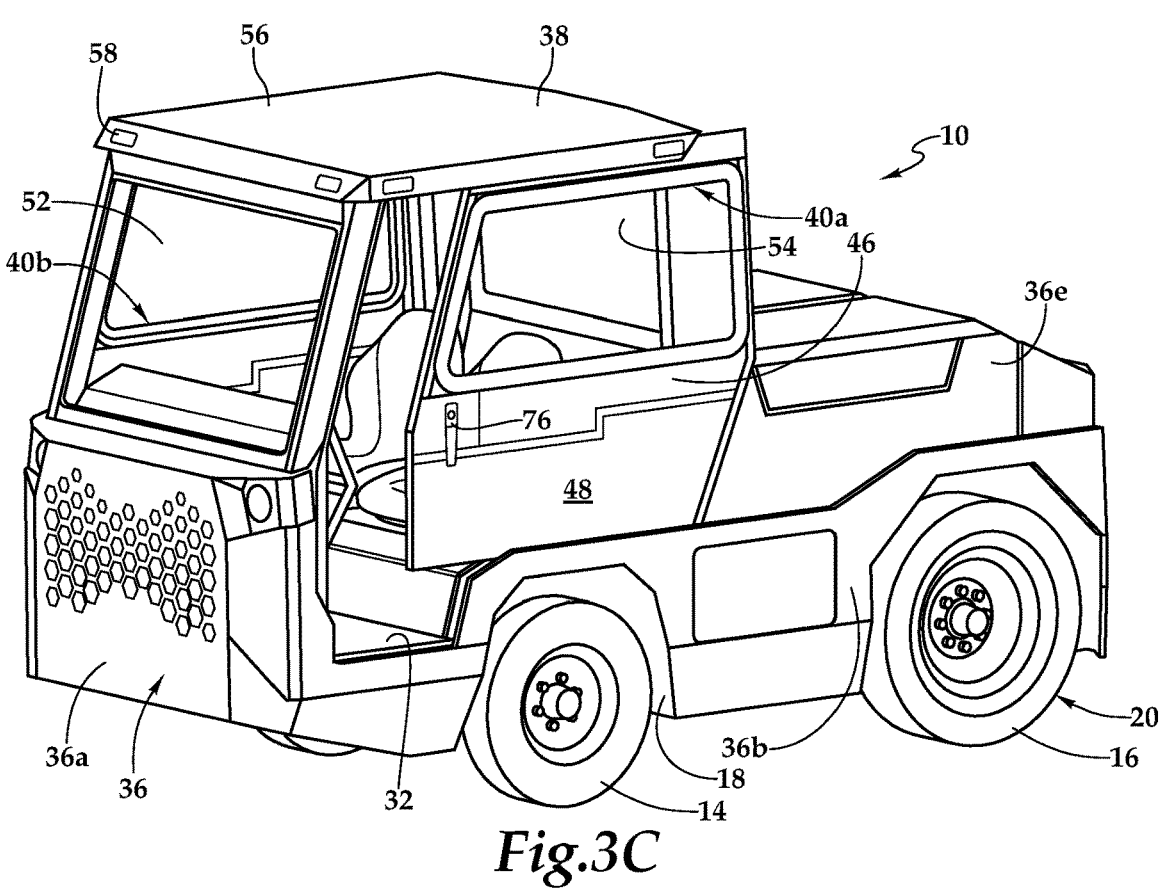
Figure 4C:
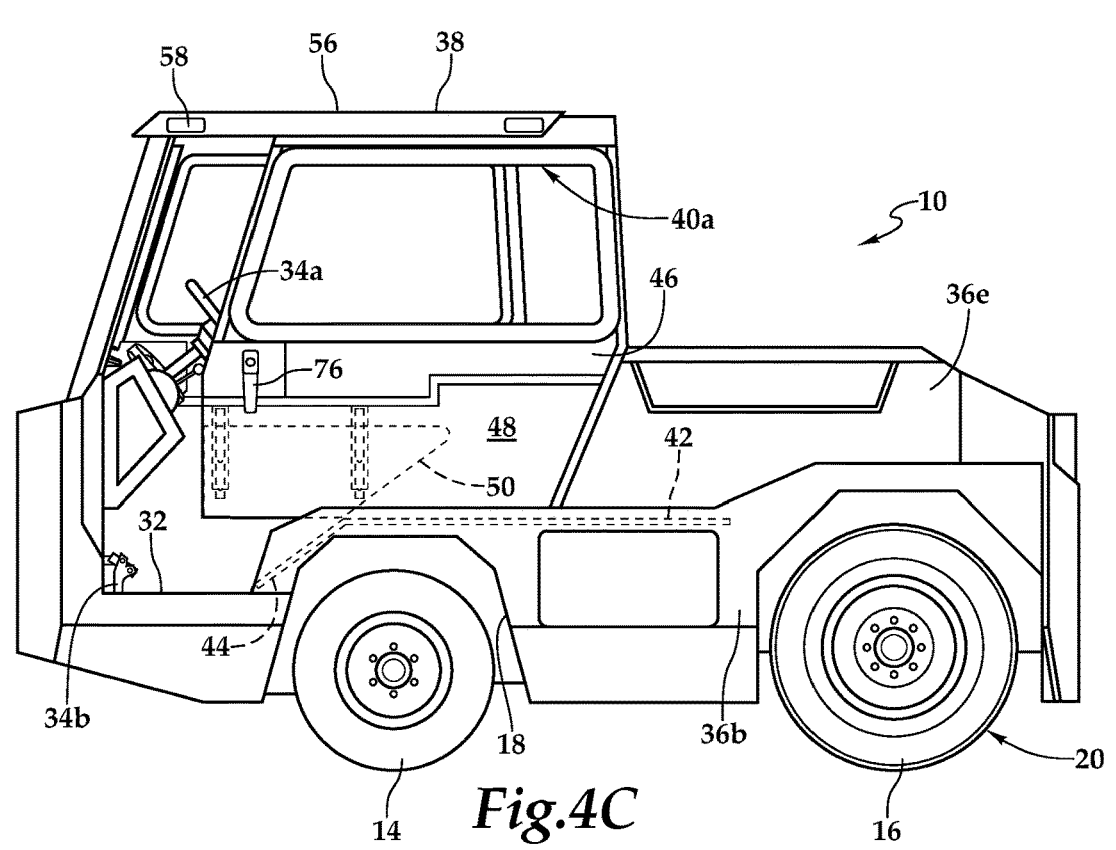

As best seen in FIGS. 3C and 4C, as the operator further translates door 46 from the fully closed position toward the fully open position, upper track 78 continues to extend, C-channel 80 advances aftward along lower track 42 and lift surface 50a travels entirely up ramp 44 until closeout panel 50 has translated from the extended position to the retracted position within main panel 48 of door 46. As illustrated, the translation of door 46 in the longitudinal aftward direction, causes translation of closeout panel 50 in the vertical upward direction relative to main panel 48 of door 46. This translation of closeout panel 50 causes closeout panel 50 to fully retract within main panel 48 of door 46. Specifically, main panel 48 of door 46 includes inner skin 48a and outer skin 48b that form a pocket therebetween that is sized to receive closeout panel 50 therein. A telescoping slide assembly 84, depicted as a vertically oriented linear telescoping slide assembly, is coupled between closeout panel 50 and an inner surface of inner skin 48a (see also FIG. 7). In the illustrated embodiment, telescoping slide assembly 84 includes first and second slide members 84a, 84b each of which is coupled between closeout panel 50 and the inner surface of inner skin 48a. In other embodiments, a telescoping slide assembly could have other numbers of slide members either greater than or less than two. Also, in other embodiments, a telescoping slide assembly could be non-vertically oriented. Even though telescoping slide assembly 84 has been described and depicted as coupling closeout panel 50 to inner skin 48a of main panel 48, it should be understood by those having ordinary skill in the art that a telescoping slide assembly could alternatively couple closeout panel 50 to outer skin 48b of main panel 48. In addition, even though translation between closeout panel 50 and main panel 48 has been described as being accomplished using a telescoping slide assembly, it should be understood by those having ordinary skill in the art that other systems could be used to establish the translating relationship between closeout panel 50 and main panel 48 including, but not limited to, systems using rails, slots, pins, pistons or other sliding means.

Figure 3D:
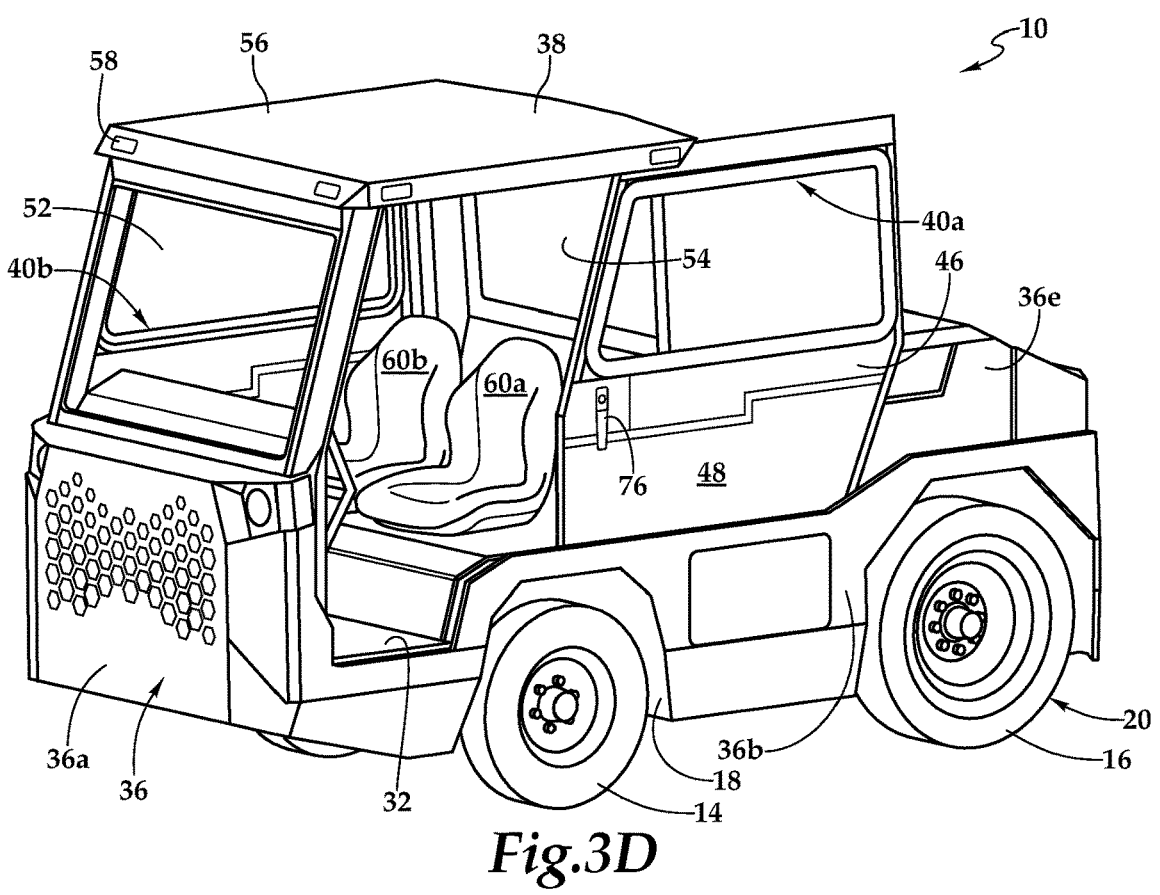
Figure 4D:
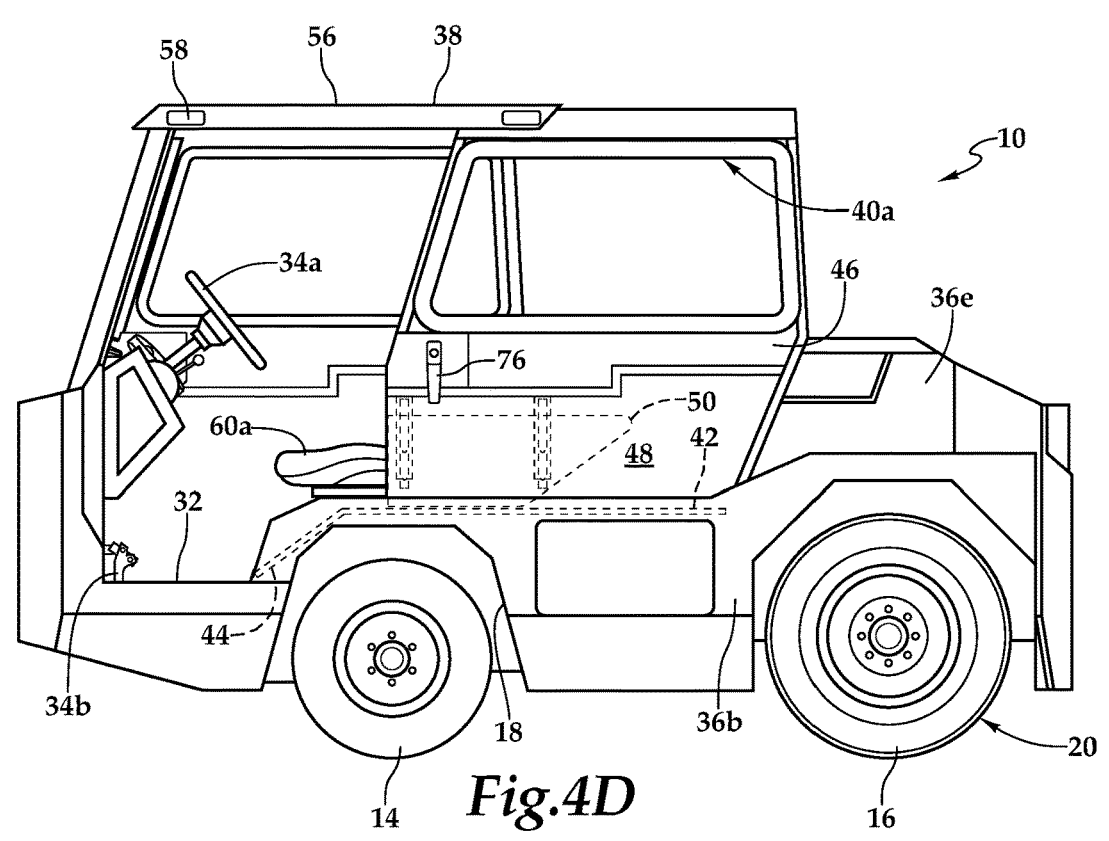
Figures 5A, 5B:
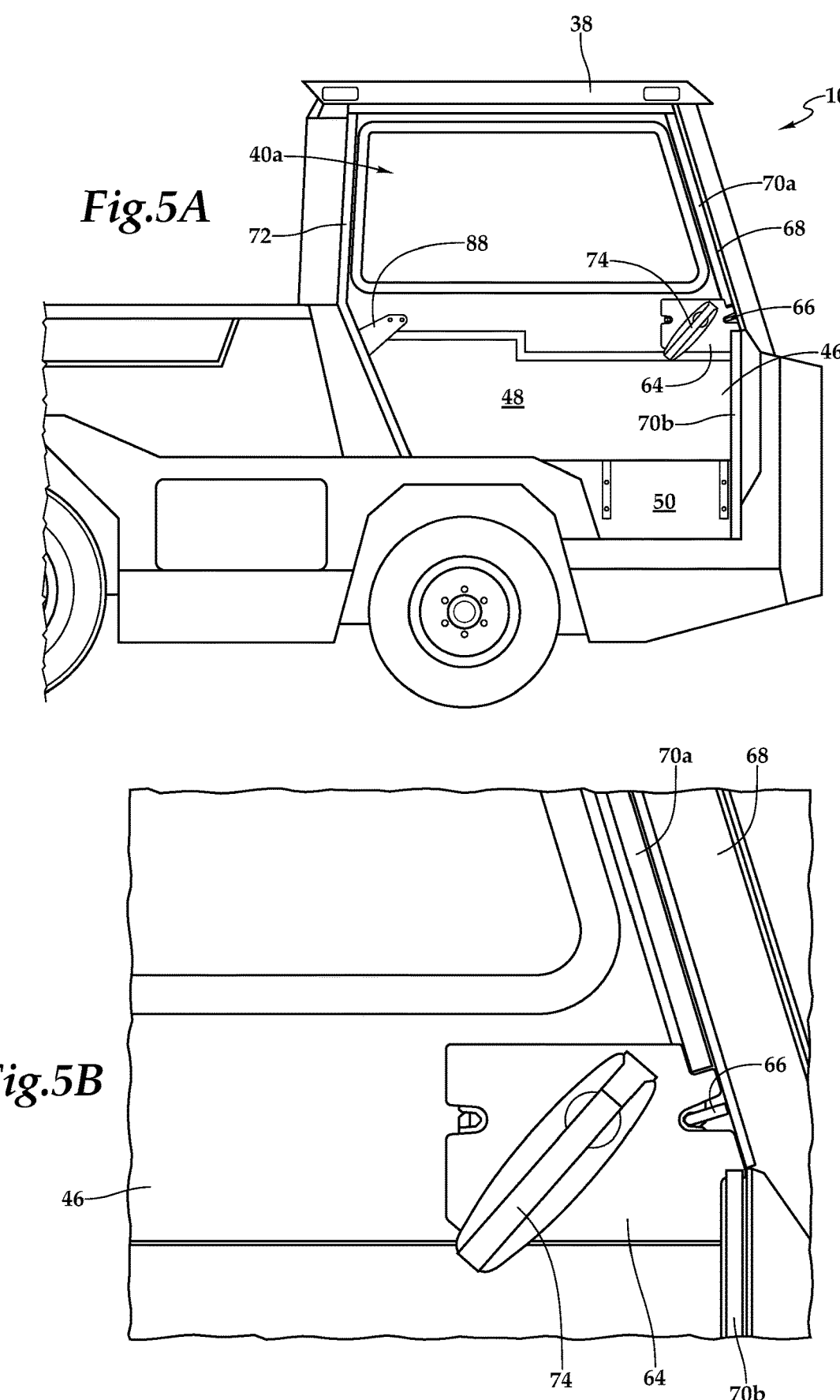
FIGS. 5A-5B are schematic illustrations depicting a door of a ground support tractor in the fully closed position in accordance with embodiments of the present disclosure.

As best seen in FIGS. 3D and 4D, the operator has translated door 46 to the fully open position. In the fully open position, door 46 is in a fully aftward orientation with the aft latch of latch assembly 64 coupled to a door striker 86 supported by aft doorstop 88 that secures door 46 in the fully open position (see also FIGS. 8A-8B). In this position, closeout panel 50 remains in the retracted position within main panel 48. In the fully open position, door 46 allows ingress to and egress from cabin 38. As such, closeout panel 50 translates from the extended position to the retracted position using non-pivoting linear motion and door 46 translates from the fully closed position to the fully open position using non-pivoting linear motion while not being encumbered or blocked by wheel well 18 and while not requiring complex mechanisms and dedicated actuation means.

When it is desired to close door 46, the operator disengages the aft latch of latch assembly 64 from door striker 86 of aft doorstop 88 using interior handle 74 or exterior handle 76 of door assembly 40a. Door 46 is now free to translate in the longitudinal direction relative to cabin 38. More particularly, door 46 may be translated in the longitudinal forward direction relative to cabin 38 which collapses upper track 78 and causes C-channel 80 to slide forward along lower track 42. Closeout panel 50 remains in the retracted position within main panel 48 until door 46 passes the location depicted in FIGS. 3C and 4C. Thereafter, lift surface 50a encounters ramp 44 of lower track 42 which enables a gravitational force to cause closeout panel 50 to translate vertically downward relative to main panel 48 as lift surface 50a travels down ramp 44, as best in seen in FIGS. 3B and 4B. When the operator has translated door 46 to the fully closed position, as best seen in FIGS. 3A and 4A, the gravitational force causes closeout panel 50 to return to the extended position and reestablish the contact relationship with cabin floor 32. In this position, door 46 is in a fully forward orientation with the forward latch of latch assembly 64 coupled to door striker 66 that secures door 46 in the fully closed position. In this position, door 46 has a sealing engagement with door frame 68 provided by forward door seals 70a, 70b and aft door seal 72. As such, closeout panel 50 translates from the retracted position to the extended position using non-pivoting linear motion and door 46 translates from the fully open position to the fully closed position using non-pivoting linear motion.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A door assembly for a vehicle, the door assembly comprising:

a lower track including a ramp; and a door slidably received by the lower track and translatable relative thereto in a first direction between a closed position and an open position, the door including a main panel and a lower panel that is translatable relative to the main panel in a second direction between an extended position and a retracted position, the second direction substantially normal to the first direction;

wherein, the ramp is configured to apply a retraction force to the lower panel that causes the lower panel to translate from the extended position to the retracted position responsive to the door translating from the closed position to the open position.

2. The door assembly as recited in claim 1 wherein, the first direction is a longitudinal direction and the second direction is a vertical direction.

3. The door assembly as recited in claim 1 wherein, the main panel further comprises inner and outer skins; and wherein, in the retracted position, the lower panel is disposed between the inner and outer skins.

4. The door assembly as recited in claim 3 wherein, the lower panel is slidably coupled to an interior surface of one of the inner and outer skins of the main panel.

5. The door assembly as recited in claim 1 wherein, the ramp has a slope between thirty degrees and forty-five degrees.

6. The door assembly as recited in claim 1 wherein, the ramp has a slope of about thirty-five degrees.

7. The door assembly as recited in claim 1 wherein, the lower panel further comprises a lift surface configured to contact the ramp; and wherein, the ramp and the lift surface have substantially common slopes.

8. A ground support tractor comprising:

a wheeled chassis;

a cabin mounted on the wheeled chassis; and a door assembly coupled to the cabin, the door assembly including:

a lower track having a ramp; and a door slidably received by the lower track and translatable in a first direction relative to the cabin between a closed position and an open position, the door including a main panel and a closeout panel that is translatable relative to the main panel in a second direction between an extended position and a retracted position, the second direction substantially normal to the first direction;

wherein, the ramp is configured to apply a retraction force to the closeout panel that causes the closeout panel to translate from the extended position to the retracted position responsive to the door translating from the closed position to the open position.

9. The ground support tractor as recited in claim 8 wherein, the door assembly further comprises an upper track; and wherein, the lower track and the upper track limit movement of the door to translation in the first direction relative to the cabin.

10. The ground support tractor as recited in claim 8 wherein, the door assembly further comprises a forward latch configured to secure the door in the closed position.

11. The ground support tractor as recited in claim 8 wherein, the door assembly further comprises an aft latch configured to secure the door in the open position.

12. The ground support tractor as recited in claim 8 wherein, the cabin further comprises a cabin floor; and wherein, the closeout panel has a contact relationship with the cabin floor when the door is in the closed position.

13. The ground support tractor as recited in claim 8 wherein, the closeout panel is disposed within the main panel when the closeout panel is in the retracted position.

14. The ground support tractor as recited in claim 8 wherein, the main panel further comprises inner and outer skins; and wherein, in the retracted position, the closeout panel is disposed between the inner and outer skins.

15. The ground support tractor as recited in claim 14 wherein, the door assembly further comprises a telescoping slide assembly coupled between the closeout panel and at least one of the inner and outer skins.

16. The ground support tractor as recited in claim 15 wherein, the telescoping slide assembly further comprises a vertically oriented linear telescoping slide assembly.

17. The ground support tractor as recited in claim 8 wherein, the closeout panel translates from the retracted position to the extended position responsive to a gravitational force as the door translates from the open position to the closed position.

18. A ground support tractor comprising:

a wheeled chassis;

a cabin mounted on the wheeled chassis; and a door assembly coupled to the cabin, the door assembly including:

a lower track having a ramp; and a door slidably received by the lower track and translatable in a first direction relative to the cabin between a closed position and an open position, the door including a main panel and a closeout panel that is translatable in a second direction relative to the main panel between an extended position and a retracted position, the second direction substantially normal to the first direction, the closeout panel having a lift surface;

wherein, the closeout panel is in the extended position when the door is in the closed position;

wherein, the closeout panel is in the retracted position when the door is in the open position;

wherein, the closeout panel translates from the extended position to the retracted position responsive to contact between the lift surface and the ramp as the door translates from the closed position to the open position; and wherein, the closeout panel translates from the retracted position to the extended position as the door translates from the open position to the closed position.

19. The ground support tractor as recited in claim 18 wherein, the ramp is configured to apply a retraction force to the closeout panel that causes the closeout panel to translate from the extended position to the retracted position responsive to the door translating from the closed position to the open position; and wherein, the closeout panel translates from the retracted position to the extended position responsive to a gravitational force as the door translates from the open position to the closed position.

* * * * *